(12) United States Patent
Lim (10) Patent No.: US 12,451,508 B2
(45) Date of Patent: Oct. 21, 2025

(54) PRESSURE ACTIVATION APPARATUS HAVING TRANSFER UNIT

(71) Applicant: APRO CO., LTD, Gunpo-si (KR)

(72) Inventor: Jong Hyun Lim, Gunpo-si (KR)

(73) Assignee: APRO CO., LTD, Gunpo-si (KR)

( * ) Notice: Subject to any disclaimer, the term of this patent is extended or adjusted under 35 U.S.C. 154(b) by 230 days.

(21) Appl. No.: 18/272,348

(22) PCT Filed: Dec. 20, 2021

(86) PCT No.: PCT/KR2021/019363
§ 371 (c)(1),
(2) Date: Jul. 14, 2023

(87) PCT Pub. No.: WO2022/164032
PCT Pub. Date: Aug. 4, 2022

(65) Prior Publication Data
US 2024/0072290 A1    Feb. 29, 2024

(30) Foreign Application Priority Data

Feb. 1, 2021    (KR) .................. 10-2021-0014161

(51) Int. Cl.
*H01M 10/04*      (2006.01)
*B65G 47/90*      (2006.01)

(52) U.S. Cl.
CPC ........ *H01M 10/0404* (2013.01); *B65G 47/90* (2013.01); *H01M 10/0481* (2013.01)

(58) Field of Classification Search
CPC .............. B65G 47/90; H01M 10/0404; H01M 10/0481
See application file for complete search history.

(56) References Cited

U.S. PATENT DOCUMENTS

| 2018/0198102 A1* | 7/2018 | Choi | ................... H01M 10/446 |
| 2024/0072290 A1* | 2/2024 | Lim | ....................... B65G 47/90 |

FOREIGN PATENT DOCUMENTS

| CN | 110539107 A | * 12/2019 | ............. B23K 37/00 |
| CN | 110661024 A | *  1/2020 | |
| CN | 210587786 U | *  5/2020 | ............. B23K 37/00 |
| KR | 10-2017-0095013 A | 8/2017 | |
| KR | 10-2017-0112628 A | 10/2017 | |
| KR | 20170112628 A | * 10/2017 | |
| KR | 10-1793162 B1 | 11/2017 | |

(Continued)

OTHER PUBLICATIONS

International Search Report for PCT/KR2021/019363 mailed May 12, 2022 from Korean Intellectual Property Office.

*Primary Examiner* — Saul Rodriguez
*Assistant Examiner* — Brendan P Tighe
(74) *Attorney, Agent, or Firm* — Revolution IP, PLLC (57) ABSTRACT

Disclosed is a pressure activation apparatus, and particularly to a pressure activation apparatus with a transfer unit that transfers a plurality of secondary battery cells accommodated in a tray to a buffer in once or twice, so that the control and mechanism for the transfer can be simplified, thereby reducing costs, facilitating maintenance, significantly shortening time taken in loading the plurality of battery cells, and, consequently, flexibly expanding and operating the number and arrangement of pressure jigs to perform a pressure activation process.

7 Claims, 8 Drawing Sheets

(56) References Cited

FOREIGN PATENT DOCUMENTS

| KR | 101873709 B1 | * | 7/2018 |
| KR | 10-2020-0042801 A | | 4/2020 |
| WO | 2020-103551 A1 | | 5/2020 |

* cited by examiner

PRESSURE ACTIVATION APPARATUS HAVING TRANSFER UNIT

TECHNICAL FIELD

The disclosure relates to a pressure activation apparatus, and particularly to a pressure activation apparatus with a transfer unit that transfers a plurality of secondary battery cells accommodated in a tray to a buffer in once or twice, so that the control and mechanism for the transfer can be simplified, thereby reducing costs, facilitating maintenance, significantly shortening time taken in loading the plurality of battery cells, and, consequently, flexibly expanding and operating the number and arrangement of pressure jigs to perform a pressure activation process.

BACKGROUND ART

A secondary battery refers to a battery that can be reused repeatedly by charging and discharging. Recently, the secondary battery has been widely used in the field of high-tech electronic devices such as smartphones, laptop computers, and electric vehicles. In particular, a lithium secondary battery has recently been actively used in various fields because it has high energy density per unit weight and can be rapidly charged compared to other secondary batteries such as conventional lead-acid batteries, nickel-cadmium batteries, nickel-hydrogen batteries, and nickel-zinc batteries.

Among such secondary batteries, a pouch-type battery cell generally includes an electrode assembly including an anode, a cathode, and a separator; a pouch casing; and electrode leads. The electrode assembly is accommodated in the pouch casing, and the electrode leads are connected to the electrode assembly and protrude outwards from the pouch casing.

Meanwhile, when the pouch-type battery cell is manufactured, the pouch casing accommodating the electrode assembly of the completed battery cell is internally filled with an electrolyte. The completed battery cell is subjected to charging and discharging processes after the pouch casing is sealed. During the charging and discharging processes of the battery cell, gas is generated inside the battery cell. The gas generated inside the battery cell increases the internal pressure of the battery cell. Further, the increased internal pressure causes the pouch casing to swell convexly. As a result, a space between electrode plates may widen, and a coupling force between an active material and a current collector may become weakened.

Therefore, a pressure activation process of pressurizing the pouch-type battery cell is performed during or after the charging and discharging processes of the pouch-type battery cell. By the pressure activation process for the pouch-type battery cell, gas is collected inside in one place. Further, the electrolyte filled inside the pouch-type battery cell is spread evenly.

The pressure activation process is carried out by a pressure activation apparatus, and the pressure activation apparatus includes pressure jigs for performing the pressure activation process while a plurality of secondary battery cells is mounted thereto. The plurality of secondary battery cells mounted to the pressure jigs are generally transported by a pick-and-place. In other words, the pick-and-place transports and mounts the plurality of secondary battery cells accommodated in a buffer.

Meanwhile, the buffer accommodates therein the plurality of secondary battery cells to be transferred to the pressure jigs by the pick-and-place, in which the plurality of secondary battery cells accommodated in the buffer are transferred from a tray by a transfer means provided separately from the pick-and-place. Specifically, the transfer means picks up the plurality of secondary battery cells accommodated and loaded in the tray and transfers them to the buffer.

However, the transfer means picks up only some (e.g., two or three secondary battery cells) of the plurality of secondary battery cells accommodated in the tray and transfers and mounts them to the buffer. Therefore, it is required for the transfer means to perform a transfer operation from the tray to the buffer several times so that the plurality of secondary battery cells to be transferred can be mounted to the pressure jigs to the buffer by the pick-and-place. Further, in order for the transfer means to sequentially transfer and mount the secondary battery cells to the buffer, the buffer needs to include a conveyor means for repositioning the secondary battery cells in sequence.

In this way, when the process of transferring the plurality of secondary battery cells accommodated in the tray to the buffer is performed by a conventional general method, the transfer means needs to reciprocate several times so as to mount the plurality of secondary battery cells to the buffer, thereby having disadvantages that the time taken in putting the plurality of secondary battery cells into the pressure jigs is increased and costs are increased and maintenance is not easy due to the complicated structure and control of the buffer and the transfer means.

Meanwhile, Korean Patent Publication No. 10-2017-0095013 (hereinafter referred to as "Related Art Document") discloses an apparatus for manufacturing a secondary battery, in which a plurality of battery cells is pressurized to remove gas from the interior of the battery cells, and a transfer unit is additionally included.

In the related art document, the transfer unit performs only the operation of transferring the plurality of secondary battery cells between a loading unit, a pressurizing unit, and an unloading unit, and does not perform the operation of transferring the plurality of secondary battery cells loaded as accommodated in the tray to the buffer before transferring them to the pressure jigs.

Accordingly, there is a need to propose a configuration and operation method for a separate transfer unit that performs the operation of transferring the plurality of secondary battery cells loaded as accommodated in the tray to the buffer before transferring them to the pressure jigs, while ensuring the expandability about the number and arrangement of pressure jigs, such as shortening the time taken in loading the plurality of secondary battery cells.

DISCLOSURE

Technical Problem

The disclosure is conceived to solve the foregoing problems of the related art, and an aspect of the disclosure is to provide a pressure activation apparatus with a transfer unit that transfers a plurality of secondary battery cells accommodated in a tray to a buffer in once or twice, so that the control and mechanism for the transfer can be simplified, thereby reducing costs, facilitating maintenance, significantly shortening time taken in loading the plurality of battery cells, and, consequently, flexibly expanding and operating the number and arrangement of pressure jigs to perform a pressure activation process.

Technical Solution

A pressure activation apparatus with a transfer unit according to the disclosure, proposed to solve the foregoing problems, includes a loading section to load a tray in which a plurality of secondary battery cells is accommodated; a transfer section to transfer the plurality of secondary battery cells accommodated in the tray to a buffer section; the buffer section to accommodate in a buffer the plurality of secondary battery cells transferred by the transfer section; and a jig section to perform a pressure activation process after the plurality of secondary battery cells accommodated in the buffer is transferred and mounted by a pick-and-place, wherein the transfer section includes a transfer unit to transfer the plurality of secondary battery cells accommodated in the tray to the buffer in once or twice.

Here, the transfer unit may include a plurality of first-side pickers to grip a first side of each of the plurality of secondary battery cells, a plurality of second-side pickers to grip a second side of each of the plurality of secondary battery cells, an opposite-side picker group space adjuster to adjust a space between the plurality of first-side pickers and the plurality of second-side pickers, and an inter-picker space adjuster to adjust a space between pickers making up the plurality of first-side picker and a space between pickers making up the plurality of second-side pickers.

Here, the inter-picker space adjuster may operate to narrow the space between the pickers making up the plurality of first-side pickers and the space between the pickers making up the plurality of second-side pickers upon gripping the plurality of secondary battery cells accommodated in the tray by the plurality of first-side pickers and the plurality of second-side pickers, and operate to widen the space between the pickers making up the plurality of first-side pickers and the space between the pickers making up the plurality of second-side pickers upon transferring the plurality of secondary battery cells to the buffer.

Here, each of the pickers making up the plurality of first-side pickers and the pickers making up the plurality of second-side pickers may be connected to a lower portion of a corresponding sliding bar, each sliding bar may be put on and slidably mounted to a guide shaft, each sliding bar may include a connection pin formed protruding therefrom, the sliding bars adjacent to each other may be connected by a guide link, and the guide link may include an elongated hole in which the connection pin protruding from the adjacent sliding bar is inserted to slide.

Here, the guide link may horizontally connect the adjacent sliding bars, and the guide link may be disposed not to interfere with another guide link upon operating to narrow a space between the sliding bars.

Here, the picker may include a connection block connected to the sliding bar, a picker actuating body to generate a driving force, a moving block to move vertically based on the driving force of the picker actuating body, an opening and closing block coupled to a lower portion of the moving block to open and close a pair of grip blocks based on the vertical movement, the pair of grip blocks moving away from each other to be opened based on downward movement of the opening and closing block and moving close to each other to be closed based on upward movement of the opening and closing block, and a support block supporting the pair of grip blocks to guide the pair of grip blocks to be opened and closed.

Here, a pair of inclined sliding portions formed to face each other and inclined to become closer to each other as going downwards may be provided at a lower side of the opening and closing block, and an inclined guide portion guiding the corresponding inclined sliding portion inserted therein to slide may be provided in each of the pair of grip blocks.

Further, the pressure activation apparatus may further include an elastic body interposed between the support block and the moving block, wherein the elastic body strengthens upward movement of the moving block and strengthens the state of the pair of grip blocks closed by the opening and closing block upon operating to move up the moving block.

Advantageous Effects

Regarding the foregoing problems and solutions, there is provided a pressure activation apparatus with a transfer unit according to the disclosure, in which the transfer unit transfers a plurality of secondary battery cells accommodated in a tray to a buffer in once or twice, so that the control and mechanism for the transfer can be simplified, thereby advantages of reducing costs, facilitating maintenance, significantly shortening time taken in loading the plurality of battery cells, and, consequently, flexibly expanding and operating the number and arrangement of pressure jigs to perform a pressure activation process.

BEST MODE

Regarding the foregoing problems, solutions and effects, embodiments of a pressure activation apparatus with a transfer unit according to the disclosure will be described below with reference to the accompanying drawings.

Figure 1:
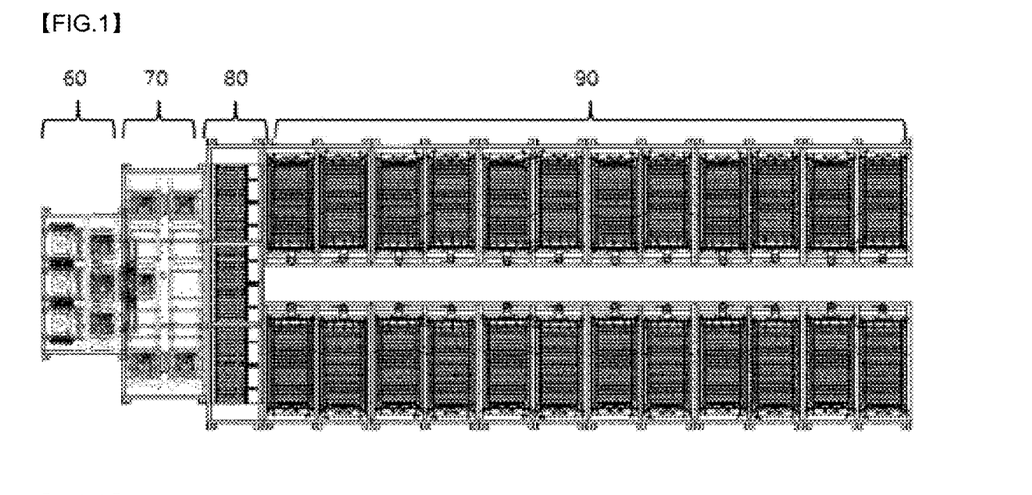
FIG. 1 is a schematic view of a pressure activation apparatus with a transfer unit according to an embodiment of the disclosure.

FIG. 1 is a schematic view of a pressure activation apparatus with a transfer unit according to an embodiment of the disclosure.

As shown in FIG. 1, a pressure activation apparatus 100 with a transfer unit according to an embodiment of the disclosure relates to a pressure activation apparatus that performs a pressure activation process for a plurality of secondary battery cells, and includes a loading section 60, a transfer section 70, a buffer section 80 and a jig section 90.

The loading section 60 performs an operation of loading a tray in which a plurality of secondary battery cells is accommodated. In other words, the loading section 60 performs the operation of loading the tray in which the plurality of cells to be subjected to the pressure activation process is accommodated. Here, the loading section 60 is described as performing the operation of loading the tray in which the plurality of cells to be subjected to the pressure activation process is accommodated, but an operation of unloading the tray in which the plurality of cells that have been subjected to the pressure activation process is accommodated may be performed by the jig section 90. However, for the simple description of the disclosure, the loading section 60 will be described below as performing the operation of loading the plurality of secondary battery cells to be subjected to the pressure activation process.

The plurality of secondary battery cells accommodated in the tray is transferred to the buffer section 80 by the transfer section 70. In other words, the transfer section 70 performs the operation of transferring the plurality of secondary battery cells accommodated in the tray to the buffer section 80. Specifically, the operation of transferring the plurality of secondary battery cells is performed by a transfer unit 50, which will be described later.

Here, the transfer section 70 is described as performing the transfer operation of transferring the plurality of cells, which are accommodated in the tray so as to be subjected to the pressure activation process, to a buffer of the buffer section 80, but may also perform the transfer operation of transferring the plurality of secondary battery cells, which are accommodated in the buffer and have been subjected to the pressure activation process through the jig section 90, to the tray. However, for the simple description of the disclosure, it will be described below that the transfer section 70 performs the transfer operation of transferring the plurality of secondary battery cells to be subjected to the pressure activation process from the tray to the buffer.

The plurality of secondary battery cells transferred by the transfer section 70 are mounted to the buffer in the buffer section 80. In other words, the buffer section 80 performs an operation of accommodating the plurality of secondary battery cells transferred by the transfer section 70 in the buffer. Here, the buffer section 80 is described as performing the operation of accommodating the plurality of secondary battery cells, which are transferred by the transfer section 70 so as to be subjected to the pressure activation process through the jig section 90, in the buffer, but the buffer section 80 may also perform the operation of accommodating the plurality of secondary battery cells that have been subjected to the pressure activation process through the jig section 90, thereby enabling the plurality of secondary battery cells that have been subjected to the pressure activation process to be transferred to the tray of the loading section 60 by the transfer section 70. However, for the simple description of the disclosure, it will be described below that the buffer section 80 performs the operation of accommodating the plurality of secondary battery cells to be subjected to the pressure activation process in the buffer so that the plurality of secondary battery cells can be transferred to the jig section 90 by a pick-and-place.

The buffer section 80 performs a buffer aligning operation. In other words, the buffer section 80 performs the buffer aligning operation so that the pick-and-place can pick up and transport the plurality of secondary battery cells accommodated in the buffer in an aligned state.

The plurality of secondary battery cells accommodated in the buffer section 80 is transported and mounted to the jig section 90 by the pick-and-place and subjected to the pressure activation process. In other words, the jig section 90 receives and mounts the plurality of secondary battery cells accommodated in the buffer from the pick-and-place and performs the operation of performing the pressure activation process.

The jig section 90 includes a plurality of jigs, each of which performs the pressure activation process while the plurality of secondary battery cells to be subjected to the pressure activation process is accommodated and mounted thereto. The jig section 90 includes the plurality of jigs, in which the plurality of jigs may be arranged in a plurality of rows.

In the pressure activation apparatus with this configuration according to the disclosure, the jig section 90 may include the plurality of jigs, and the plurality of jigs may be arranged in a plurality of rows and expanded in various numbers and arrangements.

Corresponding to such expandability of the jig section 90 according to the disclosure, it is necessary for the transfer section 70 to quickly transfer a plurality of secondary batteries to be subjected to the pressure activation process from the loading section 60 to the buffer section 80. To this end, the pressure activation apparatus 10 with the transfer unit according to the disclosure includes the transfer unit 50 that can quickly transfer the plurality of secondary battery cells to be subjected to the pressure activation process to the transfer section 70. In other words, the transfer section 70 according to the disclosure includes the transfer unit 50 for transferring the plurality of secondary battery cells accommodated in the tray to the buffer in once or twice.

In this way, the transfer unit 50 disposed in the transfer section 70 performs the operation of transferring the plurality of secondary battery cells accommodated in the tray to the buffer in once or twice. In other words, the transfer unit 50 does not perform a transfer operation several times to transfer the plurality of secondary battery cells accommodated in the tray to the buffer, but performs the transfer operation only in once or twice to pick up and transfer the plurality of secondary battery cells accommodated in the tray as a whole to the buffer.

More specifically, the number of secondary battery cells accommodated in the tray may be equal to the number of secondary battery cells to be accommodated in the buffer, and the transfer unit 50 according to the disclosure may pick up and transfer all the secondary battery cells accommodated in the tray to the buffer by a single transfer operation. In some cases, the transfer unit 50 may perform two transfer operations, specifically, to pick up and transfer some, for example, odd-numbered (even-numbered) secondary battery cells, among the plurality of secondary battery cells accommodated in the tray to the buffer, and then pick up and transfer the remaining secondary battery cells, for example, even-numbered (odd-numbered) secondary battery cells, accommodated in the tray to the buffer. In this way, the plurality of secondary battery cells may be quickly transferred to the buffer, and it is therefore possible to ensure the expandability about the number and arrangement of jigs in the jig section 90.

MODE FOR INVENTION

Below, the configuration and operations of the transfer unit 50 applied to the disclosure will be described in detail.

Figure 2:
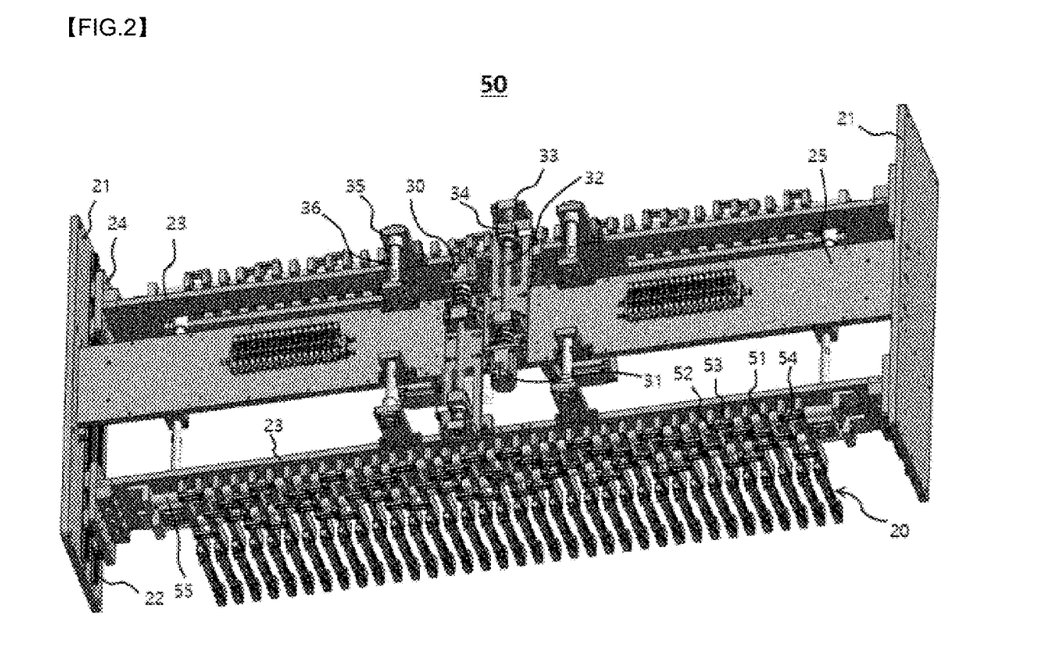
FIGS. 2 to 5 are a top perspective view, a bottom perspective view, a lateral view, and a partial side-enlarged view of a transfer unit applied to the disclosure in sequence.
Figure 3:
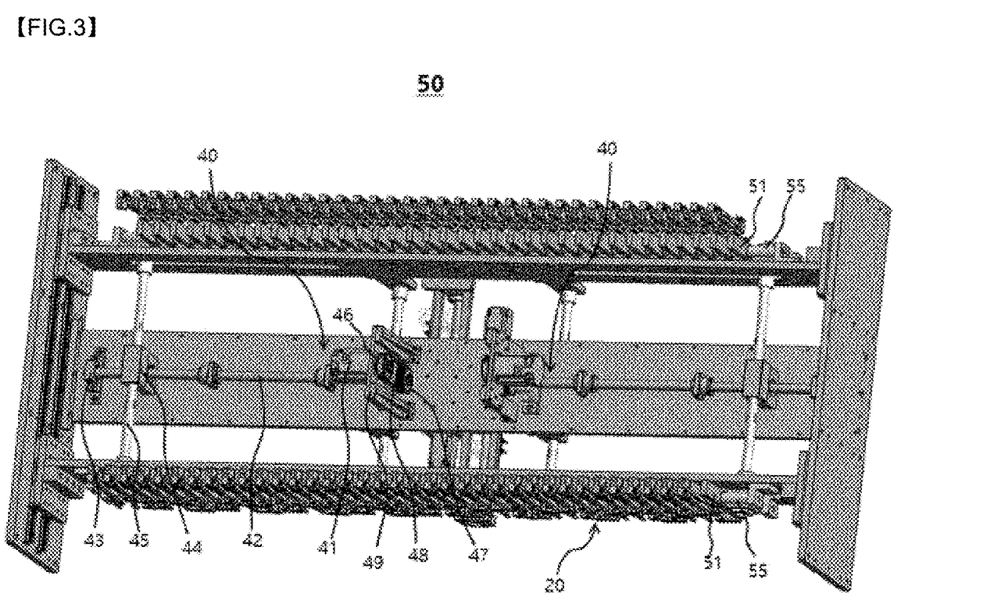
Figure 4:
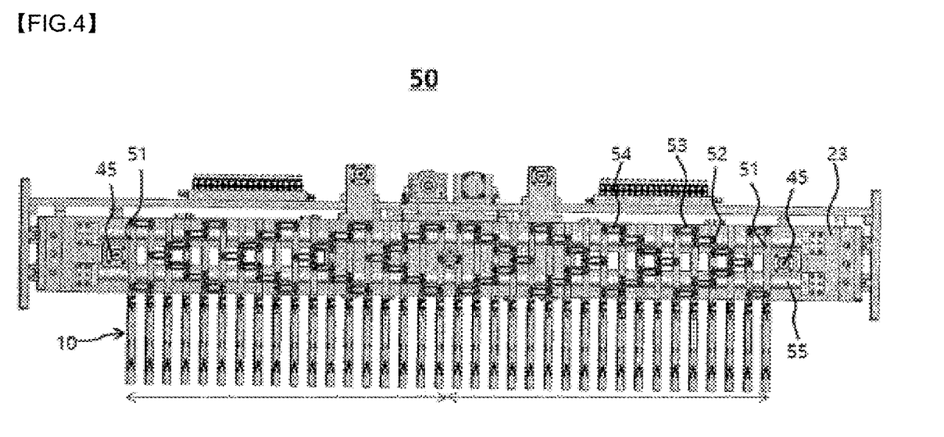

FIG. 2 is a perspective view of a transfer unit applied to the disclosure viewed from above, FIG. 3 is a bottom perspective view of a transfer unit applied to the disclosure viewed from below, and FIG. 4 is a lateral view of a transfer unit applied to the disclosure.

Referring to FIGS. 2 to 4, a transfer unit 50 according to the disclosure includes a pair of picker groups, i.e., a plurality of first-side pickers 20 and a plurality of second-side pickers 20; an opposite-side picker group space adjuster 30 for adjusting a space between the pair of picker groups, i.e., between the plurality of first-side pickers 20 and the plurality of second-side pickers 20; and an inter-picker space adjuster 40 for adjusting spaces between the pickers 20 making up each picker group, i.e., spaces between the pickers 20 making up the plurality of first-side pickers and spaces between the pickers 20 making up the plurality of second-side pickers The pair of picker groups includes a plurality of first-side pickers arranged in a row at a first side of the transfer unit 50 and a plurality of second-side pickers arranged in a row at a second side of the transfer unit 50. The plurality of first-side pickers 20 and the plurality of second-side pickers 20 are disposed opposite each other, and the pickers 20 making up the plurality of first-side pickers and the pickers 20 making up the plurality of second-side pickers are correspondingly disposed opposite each other.

Thus, the plurality of secondary battery cells may be gripped at opposite sides thereof by the pair of picker groups, i.e., the plurality of first-side pickers and the plurality of second-side pickers. In other words, the plurality of first-side pickers may respectively hold the plurality of secondary battery cells at a first side thereof, and the plurality of second-side pickers may respectively hold the plurality of secondary battery cells at a second side thereof. As a result, the pair of picker groups can stably hold the plurality of secondary battery cells, and therefore the transfer unit 50 according to the disclosure can stably transfer the plurality of secondary battery cells.

The plurality of first-side pickers and the plurality of second-side pickers are required not to interfere with the plurality of secondary battery cells while picking up the plurality of secondary battery cells at the opposite sides. To this end, the transfer unit 50 according to the disclosure operates such that the plurality of first-side pickers and the plurality of second-side pickers are moved down as being sufficiently spaced apart from each other (i.e., away from each other not to interfere with the side portions of the plurality of secondary battery cells while moving down), and then the pair of picker groups, i.e., the plurality of first-side pickers and the plurality of second-side pickers get closer to each other to make the pickers 20 hold the side portions of the secondary battery cells. Through this process, the plurality of secondary battery cells is gripped at the opposite sides thereof by the pair of picker groups.

Further, when the pair of picker groups holding the opposite side portions of the plurality of secondary battery cells transfers the plurality of secondary battery cells to the buffer, the transfer unit 50 according to the disclosure operates such that each of the pickers 20 releases the opposite side portions of the corresponding secondary battery cell and then the pair of picker groups get away from each other not to interfere with the plurality of secondary battery cells while moving up.

In order to perform the operation of adjusting the space between the plurality of first-side pickers and the plurality of second-side pickers as described above, the transfer unit 50 according to the disclosure includes the opposite-side picker group space adjuster 30. The configuration and operation of the opposite-side picker group space adjuster 30 will be described in detail later.

Meanwhile, the transfer unit 50 according to the disclosure performs the operation of transferring the plurality of secondary battery cells, which are accommodated in the tray so as to be subjected to the pressure activation process, to the buffer of the buffer section 80, in which the plurality of secondary battery cells is standing by before being transferred to the jigs of the jig section 90. However, pitch between the plurality of secondary battery cells loaded to be subjected to the pressure activation process and accommodated in the tray is different from the pitch between the plurality of secondary battery cells accommodated in the buffer and standing by before being transferred to the pressure jigs.

Specifically, because the plurality of secondary battery cells mounted to each of the pressure jigs of the jig section 90 may swell while being subjected to the pressure activation process, the pitch between the plurality of secondary battery cells mounted to the pressure jigs needs to be secured to some extent. Because the pick-and-place for transferring the plurality of secondary battery cells from the buffer to the jigs picks up the plurality of secondary battery cells from the buffer and mounts them to the jigs as they are, the pitch between the plurality of secondary battery cells accommodated in the buffer is equal to the pitch between the plurality of secondary battery cells mounted to the jigs.

On the other hand, because the plurality of secondary battery cells accommodated in the tray has not been subjected to the pressure activation process yet, the pitch between the plurality of secondary battery cells accommodated in the tray is generally smaller than the pitch between the plurality of secondary battery cells accommodated in the buffer.

In brief, the pitch (second pitch) between the plurality of secondary battery cells accommodated in the buffer is larger than the pitch (first pitch) between the plurality of secondary battery cells accommodated in the tray.

Taking such conditions into account, the transfer unit 50 according to the disclosure includes the inter-picker space adjuster 40 to adjust the space between the pickers making up the pair of pickers, in other words, the space between the pickers making up the plurality of first-side pickers and the space between the pickers making up the plurality of second-side pickers.

The inter-picker space adjuster 40 operates to narrow the space between the pickers 20 into the first pitch corresponding to the pitch (first pitch) between the plurality of secondary battery cells accommodated in the tray when the pair of picker groups holds the plurality of secondary battery cells accommodated in the tray, and operates to widen the space between the pickers 20 into the second pitch corresponding to the pitch (second pitch) between the plurality of secondary battery cells to be accommodated in the buffer when the pair of picker groups releases the plurality of secondary battery cells to be transferred to the buffer.

Figure 6:
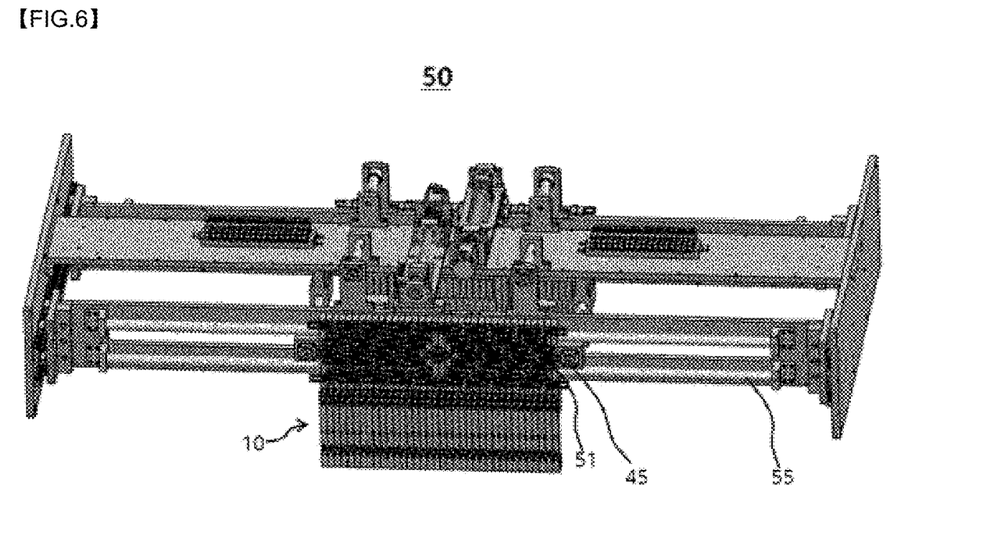
FIGS. 6 and 7 are perspective views of a transfer unit applied to the disclosure with pickers between which space is narrowed to a first pitch and widened to a second pitch, respectively.
Figure 7:
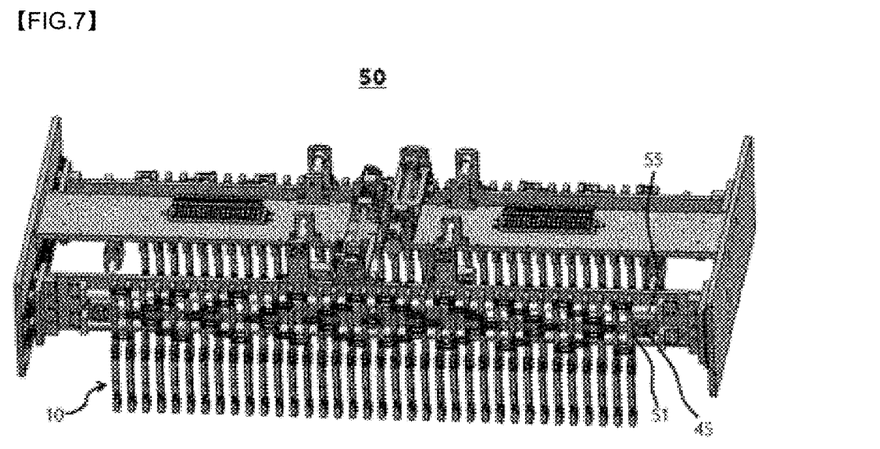

In other words, the inter-picker space adjuster 40 operates to narrow the space between the pickers making up the plurality of first-side pickers 20 and the pickers making up the plurality of second-side pickers 20 when the plurality of secondary battery cells accommodated in the tray is gripped by the plurality of first-side pickers 20 and the plurality of second-side pickers 20 (see FIG. 6), and operates to widen the space between the pickers making up the plurality of first-side pickers 20 and the space between the pickers making up the plurality of second-side pickers 20 when the plurality of secondary battery cells is transferred to the buffer (see FIG. 7).

Below, the configuration of the transfer unit 50 applied to the disclosure will be described in more detail.

As shown in FIGS. 2 to 4, the transfer unit 50 according to the disclosure includes a pair of lateral bases 21 disposed opposite each other. The pair of lateral bases 21 are arranged to move up and down by a vertical actuator (not shown). In other words, the transfer unit 50 according to the disclosure further includes the vertical actuator (not shown), and the vertical actuator drives the pair of lateral bases 21 to move up and down, thereby consequently driving the entire structure shown in FIG. 2 to move up and down.

On each inner side of the pair of lateral bases 21, a sliding rail 22 is horizontally formed. A sliding block 24 is slidably coupled to the sliding rail 22, and a sliding base 23 is coupled to the sliding block 24. As a result, the sliding base 23 can move horizontally along the lateral base 21.

Specifically, the pair of sliding bases 23 are disposed opposite each other between the pair of lateral bases 21. The opposite ends of each sliding base 23 are slidably coupled to the lateral bases 21 via the sliding block 24. As a result, the pair of sliding bases 23 may slide horizontally to move away from or close to each other. The sliding movement of the pair of lateral bases 21 is actuated by the opposite-side picker group space adjuster 30. In this regard, descriptions will be made later.

Between the pair of lateral bases 21 is fixedly coupled an upper base 25. The upper base 25, together with the pair of lateral bases 21 and the pair of sliding bases 23, make up stable frames of the transfer unit 50. The upper base 25 is mounted with the opposite-side picker group space adjuster 30.

The opposite-side picker group space adjusters 30 form a pair. In other words, one of the pair of opposite-side picker group space adjusters 30 drives one of the pair of sliding bases 23 to move horizontally so that the plurality of first-side pickers can move horizontally, and the other of the pair of opposite-side picker group space adjusters 30 drives the other of the pair of sliding bases 23 to move horizontally so that the plurality of second-side pickers can move horizontally.

The pair of opposite-side picker group space adjusters 30 have the same configuration and operation, and thus the configuration and operation of one opposite-side picker group space adjuster 30 will be described.

The opposite-side picker group space adjuster 30 includes a first actuator 31, a first ball screw 32, a first support 33, and a first coupling body 34.

The first actuator 31 is fixedly mounted to the upper base 25 and generates rotational movement. The first ball screw 32 is coupled to the first actuator 31. Thus, the ball screw 32 may be rotated by the operation of the first actuator 31. The first support 33 is coupled to the end of the first ball screw 32. Thus, the first ball screw 32 may be stably rotated while being supported on the first support 33. The first coupling body 34 is screw-coupled to the first ball screw 32.

The first coupling body 34 is screw-coupled to the first ball screw 32, and thus horizontally and rectilinearly moves as the first ball screw 32 rotates. A lower portion of the first coupling body 34 is coupled to the sliding base 23. As a result, the first ball screw 32 is rotated by the driving force of the first actuator 31, and thus the sliding base 23 slides based on the horizontal rectilinear movement of the first coupling body 34 screw-coupled to the first ball screw 32.

With this configuration, the opposite-side picker group space adjusters 30 forms a pair, and the pair of opposite-side picker group space adjusters 30 drives the pair of sliding bases 23 to move close to or away from each other.

Meanwhile, the opposite-side picker group space adjuster 30 according to the disclosure may further include a guide plate 35 and a guide bar 36 so that the sliding base 23 can move reliably by the opposite-side picker group space adjusters 30.

The guide plate 35 is formed corresponding to each of the upper base 25 and the sliding base 23, and the guide bar 36 is inserted in and disposed to be guided by the guide plate 35, which is formed corresponding to each of the upper base 25 and the sliding base 23. As a result, when the sliding base 23 is moved horizontally by the opposite-side picker group space adjuster 30, the sliding base 23 may move more stably as being guided.

The pair of sliding bases 23 may directly or indirectly couple with the pair of picker groups. According to the disclosure, each picker group is indirectly coupled to each corresponding sliding base 23 because the space between the pickers making up each of the pair of picker groups is adjusted.

Specifically, each of the pair of picker groups, i.e., the pickers 20 making up the plurality of first-side pickers and the pickers 20 making up the plurality of second-side pickers, is connected to a lower portion of a corresponding sliding bar 51, and each of the sliding bars 51 is put on and slidably mounted to a guide shaft 55, in which the guide shaft 55 is fixedly coupled along a lengthwise direction of the corresponding the sliding base 23.

In other words, the guide shaft 55 is fixedly coupled to each of the pair of sliding bases 23, and disposed along the lengthwise direction of the sliding bases 23. Further, the plurality of sliding bars 51 is put on the guide shaft 55, and each picker 20 is coupled to the lower portion of each sliding bar 51.

In result, when the sliding base 23 is moved horizontally by the opposite-side picker group space adjuster 30, the picker group indirectly connected to the sliding base 23 is also moved horizontally. Therefore, the pair of picker groups, i.e., the plurality of first-side pickers and the plurality of second-side pickers may move away from or close to each other as the space therebetween is adjusted by the operation of the pair of opposite-side picker group space adjusters 30.

As described above, each of the pickers 20 making up the plurality of first-side pickers and each of the pickers 20 making up the plurality of second-side pickers are connected to the corresponding lower ends of the sliding bars 51, and each of the sliding bars 51 is put on and slidably mounted to the guide shaft 55. To adjust the space between the adjacent pickers by connecting the pickers 20 connected corresponding to the sliding bar 51, a connection pin 52 is formed in each the sliding bar 51, and the adjacent sliding bars 51 are connected by a guide link 53, in which the guide link 53 has an elongated hole 54 to guide the connection pin 52 formed in the adjacent sliding bar 51 to be inserted and slid therein.

Figure 5:
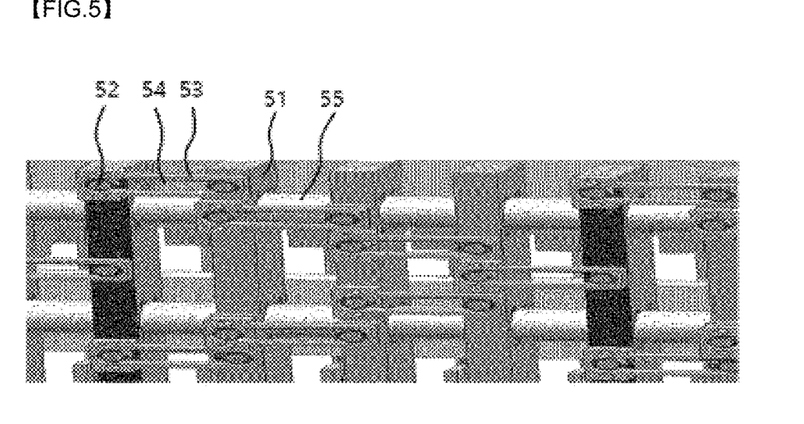

In other words, as shown in FIG. 5, each of the sliding bars 51 has the connection pin 52 protruding therefrom, and the adjacent sliding bars 51 are connected to each other by the guide link 53, in which the guide link 53 has the elongated hole 54 that guides the connection pin 52 protruding from the adjacent sliding bar 51 inserted therein to slide.

In this way, the plurality of sliding bars 51 is slidably mounted being put on the guide shaft 55, the corresponding picker 20 is connected to the lower portion of the sliding bar 51, the connection pins 52 are formed in the plurality of sliding bars 51, and the guide link 53 is coupled to the connection pin 52 formed in the adjacent sliding bar 51 and has the elongated hole 54 for guiding the connection pin 52 inserted therein to slide. Therefore, when the plurality of sliding bars 51 is slid along the guide shaft 55, the space between the plurality of sliding bars 51, specifically between the plurality of pickers connected corresponding to the plurality of sliding bars 51 is adjusted.

As described above, the pitch between the pickers according to the disclosure is adjusted by the inter-picker space adjuster 40. The inter-picker space adjuster 40 according to the disclosure adjusts the pitch between the pickers by pushing the plurality of sliding bars 51 disposed as being put on the guide shaft 55 at both sides thereof. In other words, the inter-picker space adjuster 40 adjusts the pitch between the pickers by moving the outermost sliding bars 51 disposed at the opposite sides of the plurality of sliding bars 51 in the lengthwise direction of the guide shaft 55. Because the plurality of sliding bars 51 formed with the connection pins 52 and the adjacent sliding bars 51 are connected to each other with the connection pin 52 inserted in the elongated hole 54 provided in the guide link 53, the pitch between the pickers may be adjusted into the first pitch or the second pitch by moving the outmost sliding bars 51 disposed at the opposite sides among the plurality of sliding bars 51 in the lengthwise direction of the guide shaft 55.

FIG. 6 shows a state that the space between the pickers 20 is adjusted into the first pitch corresponding to the narrowest pitch by the inter-picker space adjuster 40, and FIG. 7 shows a state that the space between the pickers 20 is adjusted into the second pitch corresponding to the widest pitch by the inter-picker space adjuster 40. The plurality of secondary battery cells in the tray is picked up in the adjusted state of the first pitch, and the plurality of secondary battery cells in the buffer is transferred in the adjusted state of the second pitch.

In order to make the inter-picker space adjuster 40 adjust the pitch between the pickers into the first pitch and the second pitch, as shown in FIG. 5 the guide link 53 horizontally connects the adjacent sliding bars 51 to each other, in which the guide link 53 may be arranged not to interfere with another guide link 53 when the sliding bars 51 are operated to become narrower to each other. As shown in FIG. 5, the guide links 53 may be arranged repeating a stepped pattern increased in height toward a certain direction.

The inter-picker space adjusters 40 form a pair as shown in FIG. 3. In other words, the pitch between the pickers making up the pair of picker groups may be adjusted by the pair of inter-picker space adjusters 40. One of the pair of inter-picker space adjusters 40 is coupled to the outermost first-side sliding bar 51 connected to the outmost first-side picker of the pickers making up the plurality of first-side pickers and the plurality of second-side pickers and performs an operation of moving the outermost first-side sliding bar 51 along the lengthwise direction of the guide shaft 55, and the other of the pair of inter-picker space adjusters 40 is coupled to the outermost second-side the sliding bar 51 connected to the outermost second-side picker of the pickers making up the plurality of first-side pickers and the plurality of second-side pickers and performs an operation of moving the outermost second-side outermost sliding bar 51 along the lengthwise direction of the guide shaft 55.

The pair of inter-picker space adjusters 40 have the same configuration and operation, and thus the configuration and operation of one inter-picker space adjuster 40 will be described.

The inter-picker space adjuster 40 includes a second actuator 41, a second ball screw 42, a second support 43, a second coupling body 44, and a connection bar 45.

The second actuator 41 generates a rotational force. The second ball screw 42 rotates based on the rotational force of the second actuator 41. The second support 43 is rotatably coupled to the end of the second ball screw 42. Therefore, the second ball screw 42 can be stably rotated based on the rotational force of the second actuator 41 as being supported on the second support 43.

The second ball screw 42 screw-couples with the second coupling body 44. Thus, the second coupling body 44 may horizontally and rectilinearly move according to the rotation of the second ball screw 42. The second coupling body 44 couples with the connection bar 45. The connection bar 45 is coupled passing through the second coupling body 44, and has a first end coupled to the outermost sliding bar 51 disposed at the side of the first-side sliding base 23 and a second end coupled to the outermost sliding bar 51 disposed at the side of the second-side sliding base 23.

The second ball screw 42 may receive a rotational force directly from the second actuator 41, or may, as shown in FIG. 3, receive a rotational force via the first pulley 46, the second pulley 47, and the belt 48 as being mounted to the mounting plate 49. In other words, the rotational force of the second actuator 41 may be transmitted from the first pulley 46 to the second pulley 47 via the belt 48, and the second ball screw 42 connected to the second pulley 47 may receive the rotational force.

By the pair of inter-picker space adjusters 40 having the foregoing configuration and operation, the space between the pickers making up the pair of picker groups may be narrowed to have the first pitch (see FIG. 6), or may be widened to have the second pitch (see FIG. 7).

Below, the configuration and operation of each of the pickers 20 making up the pair of picker groups will be described in detail with reference to FIGS. 8 to 12. The pickers 20 making up the pair of picker groups have the same configuration and operation, and thus the configuration and operation of one picker 20 will be described.

The picker 20 includes a connection block 1 connected to the sliding bar 51, a picker actuating body 3 generating a driving force, a moving block 5 moving vertically based on the driving force of the picker actuating body 3, and an opening and closing block 7 coupled to the lower portion of the moving block 5 to open and close the pair of grip blocks 10 based on the vertical movement, a pair of grip blocks 10 moving away from each other to be in an open state as the opening and closing block 7 moves down and moving close to each other to be in a closed state as the opening and closing block 7 moves up, and a support block 16 supporting the pair of grip blocks 10 and guiding the pair of grip blocks 10 to be opened and closed.

Figure 8:
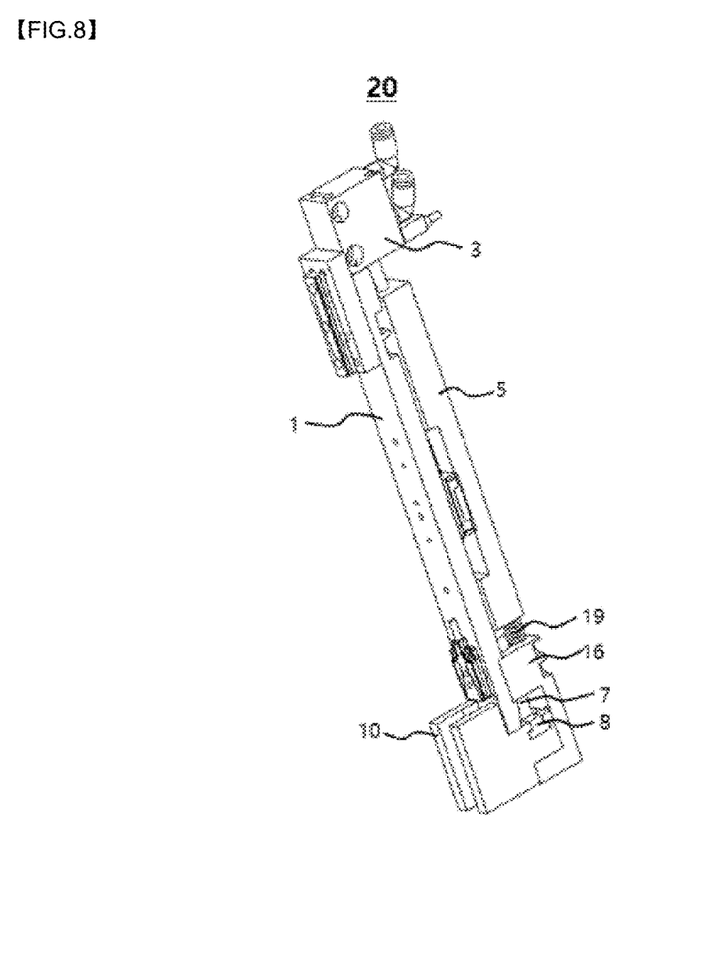
FIGS. 8 and 9 are perspective views of a transfer unit according to the disclosure with pickers viewed from a first side and a second side, respectively.
Figure 9:
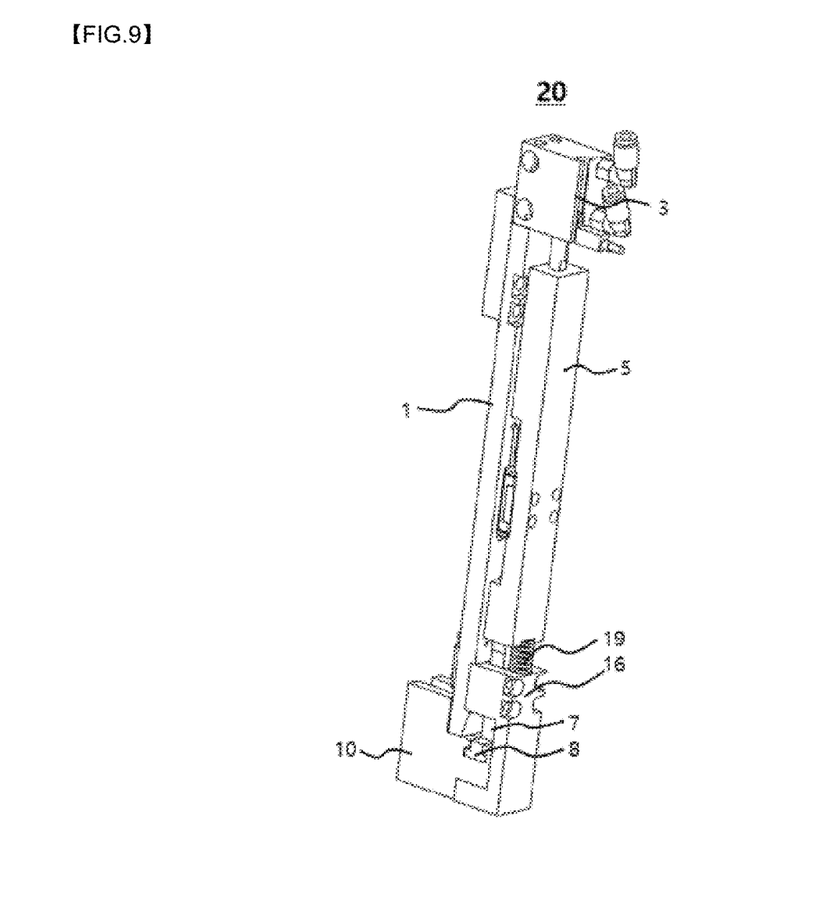
Figure 10:
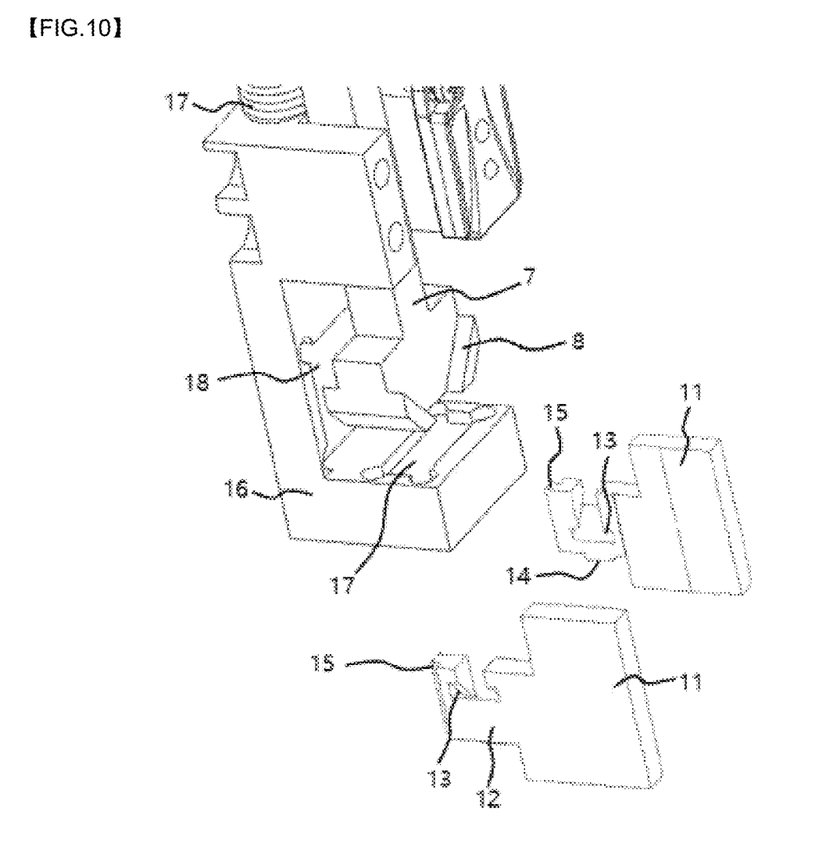
FIG. 10 is a partial perspective view of a picker in a transfer unit applied to the disclosure.

The connection block 1 is fixedly connected to a lower side of the corresponding sliding bar 51. The connection block 1 is shaped like a long bar, and arranged vertically. The picker actuating body 3 is disposed adjacent to an upper side of the connection block 1. The picker actuating body 3 drives the moving block 5 to move up and down, thereby finally causing the pair of grip blocks to be opened and closed. The picker actuating body 3 may employ any one of various sources capable of generating the driving force, for example, a pneumatic cylinder.

The moving block 5 receives the driving force from the picker actuating body 3 and moves up and down in a vertical direction. The moving block 5 may be disposed side by side opposite the connection block 1. The moving block 5 may be slidably coupled to the connection block 1 to stably move up and down in the vertical direction. Thus, the moving block 5 may be actuated by the picker actuating body 3 to move down or up in the vertical direction while sliding on the connection block 1.

The opening and closing block 7 is coupled to the lower portion of the moving block 5. The opening and closing block 7 is integrally or detachably coupled to the lower end of the moving block 5. Therefore, the opening and closing block 7 also moves up and down in the vertical direction according to the vertical movement of the moving block 5.

The lower side of the opening and closing block 7 couples with the pair of grip blocks 10, such that the pair of grip blocks 10 can be opened and closed as the opening and closing block 7 moves down and up. Specifically, the pair of grip blocks 10 are coupled to the lower side of the opening and closing block 7 such that the pair of grip blocks 10 move away from each other to be in the open state based on the downward movement of the opening and closing block 7 and move close to each other to be in the closed state based on the upward movement of the opening and closing block 7.

The pair of grip blocks 10 are required to stably slide as the opening and closing block 7 moves up and down, thereby operating to be in the open state or the closed state. To this end, the support block 16 supports the pair of grip blocks 10 and guides the pair of grip block 10 to be opened and closed. For this purpose, the support block 16 is coupled to the connection block 1, and is disposed to support and guide the lower and rear sides of the pair of grip blocks 10.

Figure 11:
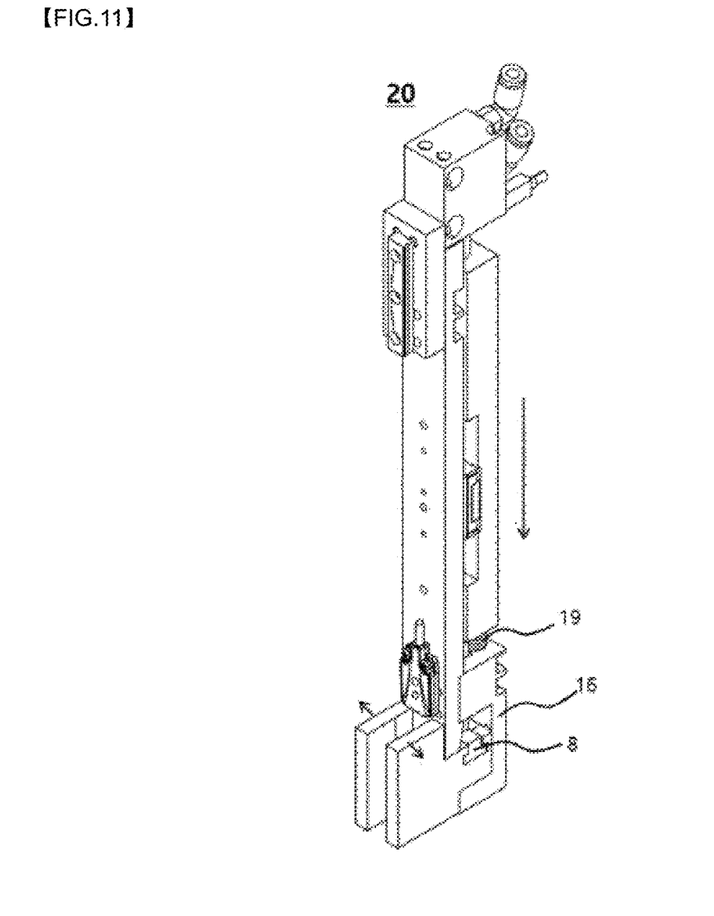
FIGS. 11 and 12 are perspective views of a first operating state (with a pair of grip blocks open) and a second operating state (with the pair of grip blocks closed) of a picker in a transfer unit applied to the disclosure.
Figure 12:
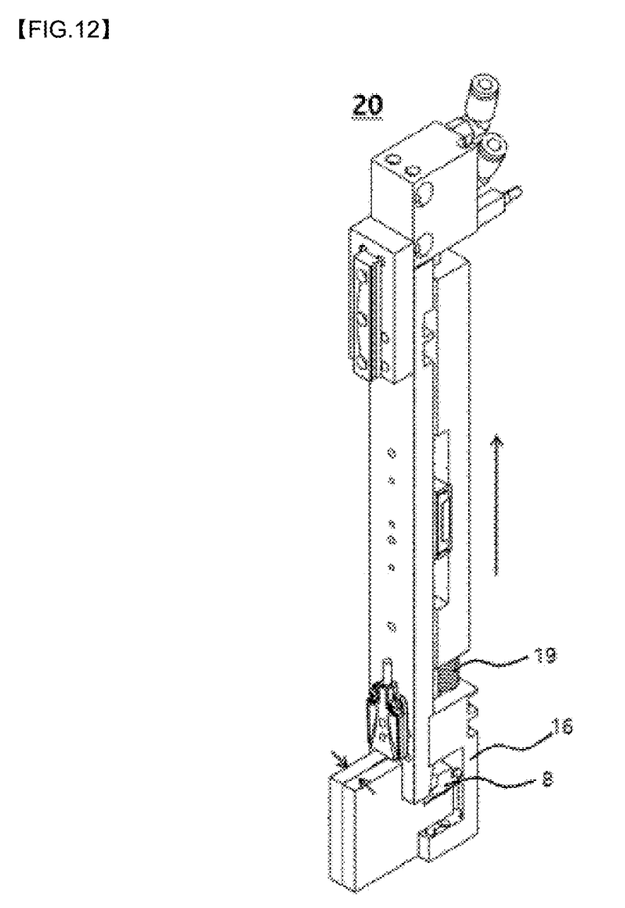

In the picker 20 according to the disclosure, when the picker actuating body 3 drives the moving block 5 to move down, the pair of grip blocks 10 becomes opened (a state of ungripping the secondary battery cells) by the opening and closing blocks 7 coupled to the moving block 5 (the ungripping operation shown in FIG. 11), and conversely, when the picker actuating body 3 drives the moving block 5 to move up, the pair of grip blocks 10 becomes closed (a state of gripping the secondary battery cells) by the opening and closing block 7 coupled to the moving block 5 (the gripping operation shown in FIG. 12).

As described above, the pair of grip blocks 10 move away from each other to be in the open state based on the downward movement of the opening and closing block 7, and move close to each other to be in the closed state based on the upward movement of the opening and closing block 7. To this end, as shown in FIG. 10, an inclined sliding portion 8 is formed on the lower side of the opening and closing block 7 according to the disclosure, and thus an inclined guide portion 13 is formed on each of the pair of grip blocks 10.

Specifically, as shown in FIG. 10, the lower side of the opening and closing block 7 is provided with the pair of inclined sliding portions 8 formed to face each other and inclined to become closer to each other as going downwards, and each of the pair of grip blocks 10 is provided with the inclined guide portion 13 in which the corresponding inclined sliding portion 8 is inserted and guided to slide.

Each of the pair of grip blocks 10 includes a gripping portion 11 for gripping a lateral portion of the secondary battery cell, and a mounting portion 12 corresponding to a portion coupled to the opening and closing block 7 and sliding as being supported by the support block 16. In other words, each of the grip blocks 10 has a front side corresponding to the gripping portion 11 that grips the secondary battery cell, and a rear side corresponding to the mounting portion 12 that slides being supported by the support block 16 in the state of coupling with the inclined sliding portion 8 formed on the lower side of the opening and closing block 7.

In the mounting portion 12 forming each grip block 10, the inclined guide portion 13 is formed corresponding to the inclined sliding portion 8. The inclined guide portion 13 guides the inclined sliding portion 8 inserted therein to slide without separation. Therefore, the pair of inclined guide portions 13 formed in the pair of mounting portions 12 forming the pair of grip blocks 10 are formed to face each other and inclined to become closer to each other as going downwards.

The mounting portion 12 forming each of the grip blocks 10 includes a lower guide portion 14 formed at a lower side and a rear guide portion 15 formed at a rear side to be stably guided to slide while being supported by the support block 16. Correspondingly, as shown in FIG. 10, the support block 16 includes a lower guide groove 17 formed to guide the lower guide portion 14 to slide without being separated from a settled state, and a rear guide groove 18 formed to guide the rear guide portion 15 to slide without being separated from a supported state.

As described above, the moving block 5 moves up and down based on the actuation of the picker actuating body 3, thereby causing the pair of grip blocks 10 to be closed and opened. When the moving block 5 moves up, the pair of grip blocks 10 are closed. In other words, the pair of grip blocks 10 is in a state of gripping the secondary battery cell as the moving block 5 moves up.

In the gripping state corresponding to the closed state of the pair of grip blocks 10, it may be required to strengthen the force of gripping the secondary battery cell. To this end, an elastic body 19 may be further interposed between the support block 16 and the moving block 5, in which the elastic body 19 may strengthen the upward movement of the moving block 5 when the moving block 5 is driven to move up, thereby strengthening the closed state of the pair of grip blocks 10 by the opening and closing block 7.

The elastic body 19 is compressed while the moving block 5 is driven to move down by the picker actuating body 3 to operate the pair of grip blocks 10 in the open state, and conversely, restored while the moving block 5 is driven to move up by the picker actuating body 3 to operate the pair of grip blocks 10 in the closed state, thereby strengthening the gripping force.

As described above, a pressure activation apparatus according to the disclosure includes a transfer unit that transfers a plurality of secondary battery cells accommodated in a tray to a buffer in once or twice, so that the control and mechanism for the transfer can be simplified, thereby having advantages of reducing costs, facilitating maintenance, significantly shortening time taken in loading the plurality of battery cells, and, consequently, flexibly expanding and operating the number and arrangement of pressure jigs to perform a pressure activation process.

Although a few embodiments of the disclosure have been described above, it will be apparent for a person having ordinary knowledge in the art that these descriptions are for the illustrative purposes only and various changes can be made without departing from the scope of the disclosure. Accordingly, the genuine technical scope of the disclosure should be defined by the appended claims.

INDUSTRIAL APPLICABILITY

A pressure activation apparatus according to the disclosure includes a transfer unit that transfers a plurality of secondary battery cells accommodated in a tray to a buffer in once or twice, so that the control and mechanism for the transfer can be simplified, thereby having industrial applicability of reducing costs, facilitating maintenance, significantly shortening time taken in loading the plurality of battery cells, and, consequently, flexibly expanding and operating the number and arrangement of pressure jigs to perform a pressure activation process.

The invention claimed is:

1. A pressure activation apparatus with a transfer unit, comprising:
   a loading section configured to load a tray in which a plurality of secondary battery cells is accommodated;
   a transfer section configured to transfer the plurality of secondary battery cells accommodated in the tray to a buffer section;
   the buffer section configured to accommodate in a buffer the plurality of secondary battery cells transferred by the transfer section; and
   a jig section configured to perform a pressure activation process after the plurality of secondary battery cells accommodated in the buffer is transferred and mounted by a pick-and-place,
   wherein the transfer section comprises transfer unit configured to transfer the plurality of secondary battery cells accommodated in the tray to the buffer in once or twice
   wherein the transfer unit includes:
   a plurality of first-side pickers configured to grip a first side of each of the plurality of secondary battery cells;
   a plurality of second-side pickers configured to grip a second side of each of the plurality of secondary battery cells;
   an opposite-side picker group space adjuster configured to adjust a space between the plurality of first-side pickers and the plurality of second-side pickers; and
   an inter-picker space adjuster configured to adjust a space between pickers making up the plurality of first-side picker and a space between pickers making up the plurality of second-side pickers,
   wherein the picker includes:
   a connection block connected to a sliding bar, which is configured to connect the picker to an adjacent component of the transfer unit,
   a picker actuating body configured to generate a driving force;
   a moving block configured to move vertically based on the driving force of the picker actuating body;
   an opening and closing block coupled to a lower portion of the moving block to move vertically along with the moving block,
   a pair of grip blocks configured to directly contact the secondar battery cell to grip the secondary battery cell, and coupled to the opening and closing block to be opened and closed based on vertical movement of the opening and closing block, the pair of grip blocks moving away from each other to be separated from the secondary battery cell for releasing the secondary battery cell, by downward movement of the opening and closing block, and moving close to each other to be in contact with the secondary battery cell for gripping the secondary battery cell, by upward movement of the opening and closing block; and
   a support block configured to support bottom portions of the pair of grip blocks to guide the pair of grip blocks to be opened and closed.

2. The pressure activation apparatus of claim 1, wherein the inter-picker space adjuster operates to narrow the space between the pickers making up the plurality of first-side pickers and the space between the pickers making up the plurality of second-side pickers upon gripping the plurality of secondary battery cells accommodated in the tray by the plurality of first-side pickers and the plurality of second-side pickers, and operates to widen the space between the pickers making up the plurality of first-side pickers and the space between the pickers making up the plurality of second-side pickers upon transferring the plurality of secondary battery cells to the buffer.

3. The pressure activation apparatus of claim 2, wherein each of the pickers making up the plurality of first-side pickers and the pickers making up the plurality of second-side pickers is connected to a lower portion of the corresponding sliding bar, each sliding bar is put on and slidably mounted to a guide shaft, each sliding bar comprises a connection pin formed protruding therefrom, the sliding bars adjacent to each other are connected by a guide link, and the guide link comprises an elongated hole in which the connection pin protruding from the adjacent sliding bar is inserted to slide.

4. The pressure activation apparatus of claim 3, wherein the guide link horizontally connects the adjacent sliding bars, and the guide link is disposed not to interfere with another guide link upon operating to narrow a space between the sliding bars.

5. The pressure activation apparatus of claim 1, wherein a pair of inclined sliding portions are form at a lower end of the opening and closing block to face each other and to be inclined to become closer to each other as extending downward, and a pair of inclined guide grooves into which the pair of inclined sliding portions are inserted, respectively are formed in the pair of grip blocks, respectively, to guide the inclined sliding portions to slide therein.

6. The pressure activation apparatus of claim 1, further comprising an elastic body interposed between the support block and the moving block, wherein the elastic body strengthens upward movement of the moving block and strengthens the state of the pair of grip blocks closed by the opening and closing block upon operating to move up the moving block.

7. The pressure activation apparatus of claim 1, wherein the pair of the grip blocks are configured to be parallel to each other while moving away from each other to be opened.

* * * * *